United States Patent

Cyba

[15] 3,669,926
[45] June 13, 1972

[54] STABILIZING PLASTIC WITH BORATED DIHYDROXYDIPHENYL SULFIDE

[72] Inventor: Henryk A. Cyba, Evanston, Ill.
[73] Assignee: Universal Oil Products Company, Des Plaines, Ill.
[22] Filed: June 21, 1967
[21] Appl. No.: 647,643

Related U.S. Application Data

[63] Continuation-in-part of Ser. No. 462,754, June 9, 1965.

[52] U.S. Cl. ..................260/45.95, 260/45.7 R, 260/45.7 P, 260/45.7 S, 260/45.75 N, 260/45.8 N, 260/45.85 N, 260/45.85, 260/45.9 R, 260/45.9 P, 424/185

[51] Int. Cl. .......................................................C08f 45/58
[58] Field of Search.................................................260/45.95

[56] References Cited

UNITED STATES PATENTS

| | | | |
|---|---|---|---|
| 3,131,164 | 4/1964 | Doyle et al. | 260/45.95 |
| 3,224,971 | 12/1965 | Knowles et al. | 252/46.3 |

*Primary Examiner*—Donald E. Czaja
*Assistant Examiner*—Donald J. Barrack
*Attorney*—James R. Hoatson, Jr. and Bernard L. Kramer

[57] ABSTRACT

Stabilizing plastic by incorporating therein a minor but stabilizing concentration of borated dihydroxydiphenyl sulfide.

11 Claims, No Drawings

STABILIZING PLASTIC WITH BORATED DIHYDROXYDIPHENYL SULFIDE

CROSS-REFERENCE TO RELATED APPLICATION

This application is a continuation in part of copending application Ser. No. 462,754, filed June 9, 1965.

DESCRIPTION OF THE INVENTION

This invention relates to the stabilization of plastic against deterioration due to one or more of oxidation, ultraviolet light, heat and other deleterious reactions which occur in the plastic upon exposure to weathering.

Stabilization of the plastic is accomplished in accordance with the present invention by incorporating therein a borate of a dihydroxydiphenyl sulfide and, more particularly, a borate of a dihydroxydiphenyl sulfide of the following general formula:

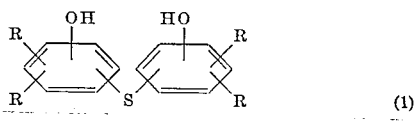

(1)

where R is hydrogen, hydrocarbyl or halogen.

Where R in the above formula is hydrocarbyl, it preferably is selected from alkyl and cycloalkyl groups. The alkyl group preferably contains from 1 to 20 or more carbon atoms and may be of normal, secondary or tertiary configuration. Where R is cycloalkyl, it preferably is cyclohexyl, although it may comprise cycloalkyl containing from 3 to 10 or more carbon atoms in the cyclic structure and thus will include cyclopropyl, cyclobutyl, cyclopentyl, cycloheptyl, cyclooctyl, cyclononyl, cyclodecyl, etc. In another embodiment R may be aryl and thus will be selected from phenyl, naphthyl or anthracyl. It is understood that the cyclic rings of the R substituent may contain hydrocarbyl substituents attached thereto. In still another embodiment the R group may contain non-hydrocarbyl substituents such as nitrogen, oxygen or sulfur. Illustrative examples include those in which the R group is alkoxy, cycloalkoxy, phenoxy, carbonyl, mercaptyl, etc. Where R said halogen it preferably is chlorine or bromine, although it may be iodine or fluorine.

It is understood that R in the above formula may comprise one or more substituent groups, these groups being selected from those hereinbefore set forth. In a preferred embodiment R is a hydrocarbyl substituent in the position para- to the hydroxy group. In this embodiment a preferred dihydroxydiphenyl sulfide is 2,2'-dihydroxy-5,5'-dialkyldiphenyl sulfide. Examples of borates of such a dihydroxydiphenyl sulfide will be illustrated structurally in Example I of the present application.

The dihydroxydiphenyl sulfide, for use as a reactant in preparing the borate of the present invention, is prepared in any suitable manner. In one method this is prepared by the reaction of a phenol with sulfur dichloride. This reaction is well known and need not be described in detail herein, although one such preparation will be included in an example of the present application. When prepared in this manner, the particular dihydroxydiphenyl sulfide will be determined by the particular phenol used for reaction with sulfur dichloride. For example, p-alkylphenol will react with sulfur dichloride to form primarily 2,2'-dihydroxy-5,5'-dialkyldiphenyl sulfide. However, o-alkylphenol when reacted with sulfur dichloride will form a mixture of products including 3,3'-dialkyl-4,4'-dihydroxydiphenyl sulfide and undoubtedly some 2,2'-dihydroxy-3,3'-dialkyldiphenyl sulfide. Because the separation of these dialkyldihydroxydiphenyl sulfides may be rather difficult, it is preferred that the mixture be used as reactants to form a mixture of the borates.

In still another embodiment the dihydroxydiphenyl sulfide is a 4,4'-dihydroxydiphenyl sulfide or such a compound containing a hydrocarbyl or halogen substituent in the 2,2'-positions or hydrocarbyl and/or halogen substituents in the 2,2'-6,6'-positions.

From the above description, it will be seen that any suitable dihydroxydiphenyl sulfide may be used in preparing the borate composition of the present invention. The borate is prepared by reacting the dihydroxydiphenyl sulfide with a suitable borylating agent. A particularly preferred borylating agent is boric acid. Other borylating agents include trialkyl borates in which the alkyl groups preferably contain from 1 to 4 carbon atoms each. In the use of the latter type borylating agent, the reaction is effected by transesterification and, accordingly, there is no advantage to using trialkyl borates containing more than 4 carbon atoms in each alkyl group, although the higher boiling trialkyl borates may be used when satisfactory and advantages appear therefor. Still other borylating agents include boric anhydride, boric oxide, boric acid complex, alkyl boric acid $[RO-B-(OH)_2]$, dialkyl boric acid $[(RO)_2-B-OH]$, cycloalkyl boric acid, dicycloalkyl boric acid, aryl boric acid, diaryl boric acid, boronic acid $[(R-B-(OH)_2]$, alkyl boronic acid $[R-B-(OH)(OR')]$, cycloalkyl boronic acid, aryl boronic acid, boronic acid $(R_2-B-OH)$, or substitution products of these with alkoxy, alkyl, aryl and/or halo groups.

The reaction of the borylating agent and the dihydroxydiphenyl sulfide is effected in any suitable manner. The ortho-borates are formed by heating and stirring the reactants at a temperature up to about 120° C. and preferably within the range of from about 60° C. to about 100° C. when using boric acid. The meta-borates are formed at a temperature above about 100° C. and thus may be within the range of from about 100° C. to about 200° C. or more. The higher temperature of from about 100° C. to about 200° C. also is used when employing trialkyl borates in order to effect the transesterification reaction. In one method the reactants are refluxed in the presence of a solvent. Any suitable solvent may be used and advantageously comprises an aromatic hydrocarbon solvent including benzene, toluene, xylene, ethylbenzene, cumene, etc. Other solvents include n-hexane, n-heptane, n-octane, chlorinated hydrocarbons, etc., or mixtures thereof. The use of a solvent is particularly preferred when boric acid is used as the borylating agent. When using a trialkyl borate as the borylating agent, the solvent may be omitted. While no catalyst normally is required, a catalyst may be used when employing the trialkyl borate. Any suitable catalyst may be employed including sodium hydrogen sulfate, potassium hydrogen sulfate, tin oxide, polyalkyl tin derivatives, alkoxy tin derivatives, polyalkyl titanium derivatives, alkoxy titanium derivatives, trialkyl or trialkoxy aluminum, toluene sulfonic acid, benzene sulfonic acid, various sulfonated ion exchange resins, solid phosphoric acid, polyphosphoric acid, sulfuric acid and in fact any suitable esterification or transesterification catalyst. The proportions of borylating agent and dihydroxydiphenyl sulfide will be selected with reference to the positions of the hydroxy groups and will be in the range of from about 0.5 to 2 mole proportions of borylating agent per one mole proportion of dihydroxydiphenyl sulfide.

In another embodiment, an alcohol, including aliphatic or aromatic alcohol, or mercaptan, including aliphatic or aromatic mercaptan, is included in the reaction mixture to satisfy one or two of the valences of the boron. When used, the alcohol or mercaptan is employed in an amount of from about 1 to 2 mole proportions thereof per 1 mole proportion of the dihydroxydiphenyl sulfide. The proportions will depend upon whether a boric acid, boronic acid or borinic acid is used as the borylating agent. When boric acid is used, up to 2 mole proportions of the alcohol or mercaptan may be employed. When boronic acid is used, up to one mole proportion of the alcohol or mercaptan may be employed. The alcohol or mercaptan will not be used when a borinic acid is used or the borylating agent. Preferred aliphatic alcohols include methanol, isopropanol, n-butanol, sec-butyl alcohol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, etc. Preferred aromatic alcohols include phenol, cresol, xylenol, etc. The aliphatic or aromatic alcohol may be substituted with alkoxy groups or thioalkoxy groups. Preferred mercaptans include butyl mercaptan, pentyl mercaptan, hexyl mercaptan, heptyl mercaptan, octyl mercaptan, nonyl mercaptan, decyl mercaptan, undecyl mercaptan, dodecyl mercaptan, etc., and thiophenol, thiocresol, thioxylenol, etc.

The temperature of the refluxing will depend upon the particular solvent employed. For example, with benzene as the solvent, the temperature will be of the order of 80° C. When using toluene, the temperature will be of the order of 110° C. When using xylene, the temperature will be of the order of 140° C.

As hereinbefore set forth, the reaction is readily effected by refluxing or borylating agent and dihydroxydiphenyl sulfide, with or without solvent and/or catalyst as required. Refluxing is continued until the required amount of water when using boric acid or alcohol when using trialkyl borate is collected. Following completion of the reaction, the solvent and alcohol, if any, may be removed by vacuum distillation. The borated dihydroxydiphenyl sulfide generally is recovered as a solid and may be used as such or, when desired, the product may be retained in the solvent and used as such or the product may be prepared as a solution in a different solvent and used in this manner.

As hereinbefore set forth the exact structure of the borated product will vary with the particular dihydroxydiphenyl sulfide employed, with the particular borylating agent employed, with the conditions under which the borylation is effected and whether an extraneous alcohol or mercaptan is used. For example, when the hydroxy groups are in close proximity as, for example, 2,2'-dihydroxydiphenyl sulfide, 2,2',5,5'-dialkyldiphenyl sulfide, etc., one mole proportion of boric acid may react with the adjoining hydroxy groups to form a cyclic structure. Accordingly, two valences of the boron are satisfied and this leaves one unsatisfied valence which may react with the extraneous alcohol or mercaptan if employed or with a different dihydroxydiphenyl sulfide molecule. When the hydroxy groups of the dihydroxydiphenyl sulfide are positioned further apart as, for example, in 4,4'-dihydroxydiphenyl sulfide, 3,3'-dialkyl-4,4'-dihydroxydiphenyl sulfide etc., one mole proportion of boric acid will react with each hydroxy group. As hereinbefore set forth when the reaction is effected at a higher temperature, the meta-borate is formed. When employing a trialkyl borate as the borylating agent, either complete or partial transesterification occurs, depending upon the proportions of reactants and conditions of operation.

From the above discussion, it will be seen that the exact structure of the borate may vary and also that the product may consist of a mixture of compounds. Accordingly, the additives of the present invention are being claimed generically. It is understood that the different borated compounds meeting the requirements as hereinbefore set forth may be used for the purposes of the present invention but that the different additives are not necessarily equivalent in their effectiveness in the same or different substrates.

The borated dihydroxydiphenyl sulfide is advantageously used as an additive in the stabilization of plastic. The additive serves to retard oxidative deterioration, as well as to serve as weathering stabilizers to protect the plastic against ultraviolet light-induced oxidation. Also, the additive may serve as antimildew, fungicide, bactericide, etc., as well as anti-static or anti-blocking additives and dye sites in plastics. The term plastic is intended to include plastics, resins, other polymeric coatings, textiles, rubber, etc.

Illustrative plastics which are stabilized in accordance with the present invention include polymonoolefins such as polyethylene, polypropylene, polybutylene, mixed ethylene propylene polymers, mixed ethylene butylene polymers, mixed propylene butylene polymers and polymers of higher molecular weight olefins. The solid olefin polymers are used in many applications including electrical insulation, lightweight outdoor furniture, awnings, cover for greenhouses, fibers, etc. In many of these applications the solid olefin polymer is exposed to sunlight and air.

Another plastic being used commercially on a large scale is polystyrene. The polystyrene type resins are particularly useful in the manufacture of molded or machined articles which find application in such goods as windows, optical goods, automobile panels, molded household articles, etc. One disadvantage of polystryrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylontrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include Nylon (polyamide), Perlon L or 6-Nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), Rayon, etc. Here again, deterioration occurs due to ultraviolet light and oxidation. In addition, the additives of the present invention may serve as dye sites in plastics. This is especially desirable in plastics used for textiles, as for example, use of plastics for carpeting, fabrics, etc. Furthermore, the additives of the present invention also may inhibit discoloration of the plastic.

Still other plastics are prepared from other monomers and are available commercially. Illustrative examples include polyurethanes, both the urethane foams and the rigid resins, epoxy resins, polycarbonates, etc. Still other illustrative examples include phenol-formaldehyde resins, urea-formaldehyde resins, melamine-formaldehyde resins, acryloid plastics which are derived from methyl, ethyl and higher alkyl acrylates and methacrylates as monomers used in he polymerization. Other polymers include polyacetals, especially polyformaldehydes such as "Delrin" and "Celcon." Still other substrates include vinyl, acrylic nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), Neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. It is understood that the additives of the present invention may be used in any coating which is subject to exposure to ultraviolet light, oxidation, heat, etc. While the additives of the present invention are especially useful in plastics, resins, polymers, etc., which are subject to outdoor exposure, it is understood that these additives also may be used advantageously in other plastics, resins, polymers, coatings, etc. which normally are not exposed outdoors.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6-diteriarybutyl-4-methylphenol. Other inhibitors which may be used generally will be of the phenolic or amine type and include phenyl-alpha-naphthylamine, phenyl-beta-naphthylamine, phenothiazine, Nonox WSP, Nonox Cl, dialkylated phenols, trialkylated phenols including 2,4-dimethyl-6-tertiarybutylphenol, etc., Santonox R, Santowhite, alkyl-alkoxyphenols, 2246 (2,2'-methylene-bis-(4-methyl-6-tert-butylphenol) and 425 (2,2'-methylene-bis-(4-ethyl-6-tert-butylphenol) (American cyanamid), diphenyl-p-phenylenediamine, 1,1,3-tris-(2-methyl-4-hydroxy-5-t-butylphenyl)-butane, 703 (2,6-di-tert-butyl-alpha-dimethylamino-p-cresol) (Ethyl Corporation), 4,4'-bis-(2-methyl-6-tert-butylphenyl); 4,4'-thio-bis-(6-tert-butyl-o-cresol); 4,4'-bis-(2,6-di-tert-butylphenol); 4,4'-methylene-bis-(2,6-di-tert-butylphenol); Salol (salicyclic acid esters, (p-octyl-phenyl-salicylate, various phosgene alkylated phenol reaction products, etc. Other ultraviolet light stabilizers include nickel-bis-dithiocarbamates and especially nickel-bis-dibutyldithiocarbamate, nickel-bis-dihydroxypolyalkylphenol sulfides, especially [2,2'-thiobis-(4-t-octylphenolato)]-n-butylamine nickel (II), dilauryl beta-mercaptodipropionate, dihydroxytetralkyl sulfides, dihydroxytetralkyl methanes, various trithiosphites as trilaurylthiophosphate, di-alkylphosphites, trialkylphosphites, high molecular weight nitriles, various Mannich bases, various N-hydroxyphenyl-benzotriazoles such as 2-(2'-hydroxy-5'-octylphenyl)-benzotriazole,2-(2'-hydroxy-5'-dodecylphenyl)-benzotriazole, 2-(2'-hydroxy-5'octoxyphenyl)-benzotriazole, 2-(2'-hydroxy-5'-dodecoxyphenyl)-benzotriazole, Tinuvin 326, etc., in general, any alkyl or alkoxyphenyl substituted benzotriazole, etc. The additional inhibitor may be used in a concentration of from about 1 percent to about 200 percent by weight and generally from about 10 percent to about 75 percent by weight of the additive of the present invention. Generally, the additional inhibitor will be used in a concentration within the range of from about 0.001 percent to about 3 percent and more particularly from about 0.01 percent to about 2 percent by weight of the substrate.

The additive of the present invention will be used in a stabilizing concentration which will depend upon the particular plastic. The additive may be used in a concentration as low as 0.001 percent to as high as about 25 percent but generally will be used in a concentration of from about 0.01 percent to about 5 percent by weight of the plastic.

The additive of the present invention is incorporated in the plastic in any suitable manner. For example, when it is incorporated into a solid or semi-solid plastic, resin or the like, it may be added to the hot melt with stirring, generally in a Banbury mixer, extruder or other device. When it is added to a liquid, it is incorporated into the liquid with intimate stirring.

The following examples are introduced to illustrate further the novelty and utility of the present invention but not with the intention of unduly limiting the same.

EXAMPLE I

The compound of this example is the borate of 2,2'-dihydroxy-5,5'-ditertoctyldiphenyl sulfide. The 2,2'-dihydroxy-5,5'-ditertoctyldiphenyl sulfide was prepared by dissolving 340.3 g. (1.65 mole) thereof in n-heptane solvent and adding 88.1 g. (0.88 mole) of sulfur dichloride dropwise at room temperature. The product separates as a crystalline precipitate which then was washed with n-heptane and air dried. The product had a melting point of 133° C. and a sulfur content of 7.65 percent by weight.

The borate of the above compound was prepared by refluxing 44.2 g. (0.1 mole) of the 2,2'-dihydroxy-5,5'-ditertoctyldiphenyl sulfide prepared in the above manner with 17.2 g. (0.1 mole) of nonyl-boronic acid ($C_9H_{19}B(OH)_2$) in 100 g. of benzene solvent. The reflux temperature was of the order of 80° C., and the refluxing was continued for about six hours, during which time a total of 1.9 cc. of water was collected. The reaction mixture was vacuum distilled to remove the benzene solvent and the product was recovered as a white microcrystalline solid having a melting point of about 140–150°C. The solid product was analyzed and found to contain 1.76 percent by weight of boron. It is believed that the product comprised at least one of the following compounds and, more likely, a mixture thereof.

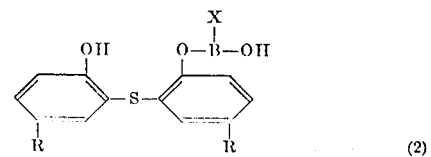

(2)

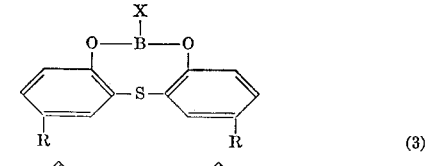

(3)

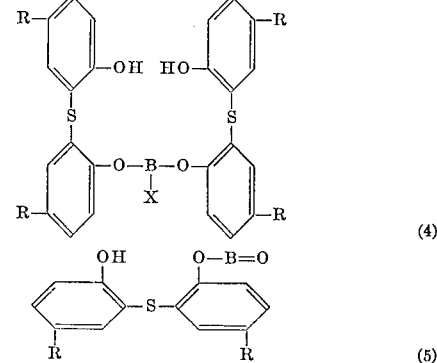

(4)

(5)

The compound illustrated in structure (2) has a theoretical boron content of 1.82 percent by weight and the compound illustrated by structure (3) has a theoretical boron content of 1.87 percent by weight. It is understood, however, that the product also may comprise compounds in which one each of the valences of boron are satisfied by different dihydroxydiphenyl sulfide molecules.

In the formulas shown above the specific products are those in which X is a nonyl radical and R is tertiaryoctyl. In a generic formula X may be hydrocarbyl, hydrocarbyloxy, hydroxy, thioxy or hydrocarbylthioxy.

EXAMPLE II

The compound of this example is prepared by the reaction of equal mole proportions of boric acid and 4,4'-dihydroxydiphenyl sulfide. The reaction is effected by refluxing the equal mole proportions of the reactants in the presence of benzene solvent. The refluxing is continued until the desired amount of water is liberated and recovered. after which the product is subjected to vacuum distillation to remove the benzene solvent.

EXAMPLE III

The compound of this example is prepared by reacting one mole proportion of 2,2'-dihydroxy-5,5'-di-tertbutyldiphenyl sulfide, one mole proportion of boric acid and one mole proportion of n-butanol. The reaction is effected by refluxing the mixture in the presence of benzene solvent. The refluxing is continued until the required amount of water is collected, after which the reaction mixture is subjected to vacuum distillation to remove the benzene solvent and to recover the borated product.

EXAMPLE IV

The compound of this example is prepared by reacting 2,2'-dihydroxy-3,5,3',5'-tetraisopropyldihydroxydiphenyl sulfide with tri-n-butyl borate. This is a transesterification reaction and is effected by heating and refluxing equal mole proportions of the reactants in the presence of xylene solvent at a temperature of about 140° C. The refluxing is continued until the required amount of butanol is collected, the butanol resulting from the transesterification reaction. Following completion of the reaction, the product is recovered in solution in the xylene solvent and is used in this manner as an additive to organic substrates.

EXAMPLE V

As hereinbefore set forth the compound of the present invention is used as an additive in plastic. The plastic of this example is solid polypropylene. The solid polypropylene without inhibitor is stated to have properties substantially as follows:

TABLE I

| | |
|---|---|
| Specific Gravity | 0.910–0.920 |
| Refractive Index, $n_D^{25}$ | 1.510 |
| Heat Distortion Temperature | |
| at 66 p.s.i. load | 116° C. |
| at 264 p.s.i. load | 66° C. |
| Tensile Yield Strength, p.s.i. | |
| (ASTM D–638–58T) | 4700 |
| (0.2" per min.) | |
| Total Elongation, % | 300–400 |
| Stiffness Flexural | 1.8 |
| (ASTM D747–50) | |
| $10^5$ p.s.i. | |
| Shore Hardness | 74D |
| (ASTM D676–55T) | |

The additive when employed was incorporated into the sample of the polypropylene by milling. The sample of the polypropylene was evaluated in a method similar to that described by Hawkins, Hansen, Matreyek and Winslow in Rubber Chemistry and Technology, Oct.–Nov., 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 grams each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The Induction Period is taken as the number of hours required to reach a pressure differential of 20 cm. Hg.

When evaluated in the above manner, a control sample of the polypropylene without additive had Induction Period of 4½ hours. Another sample of the polypropylene containing 1 percent by weight of the borate of 2,2'-dihydroxy-5,5'-ditertoctyldiphenyl sulfide, prepared as described in Example I, and 0.015 percent by weight of 2,6-ditert-butyl-4-methylphenol was evaluated in the same manner and the Induction Period was increased to about 1892 hours.

It is believed that the use of the borate in admixture with the 2,6-ditertbutyl-4-methylphenol results in a synergistic effect and increases the Induction Period even more than obtained by the borate alone. The 2,6-ditertbutyl-4-methylphenol, when used alone and evaluated in the above manner, was of little effect in increasing the Induction Period of the polypropylene.

EXAMPLE VI

The plastic of this example is solid polyethylene of the high density type. An inhibited product of this polyethylene is marketed commercially under the trade name of "Fortiflex." Samples of the polyethylene are pressed into plaques and evaluated in the Fadeometer. A batch of the polyethylene free of inhibitor is pressed into sheets of 17 mil. thickness and cut into plaques of 1⅜ by 1½ inches. When employed, the additive is incorporated in the polyethylene prior to pressing into sheets. The plaques are inserted into plastic holders, affixed onto a rotating drum and exposed to carbon arc rays at about 52° C. in the Fadeometer. The samples are examined periodically by infrared analysis to determine the carbonyl band at 1715 cm.$^{-1}$, which is reported as the "carbonyl number." The higher intensity of the carbonyl band indicates a higher carbonyl concentration (expressed as carbonyl number) and, accordingly, increased deterioration.

The additive of this example is the borate of 4,4'-dihydroxydiphenyl sulfide, prepared as described in Example II, and is incorporated in a concentration of 1 percent by weight in the polyethylene prior to pressing into sheets. This serves to stabilize the polyethylene and to considerably increase the time before a carbonyl number of 1000 is reached.

EXAMPLE VII

The plastic of this example is polystyrene. During milling of the polystryrene, 1 percent of the borate of 2,2'-dihydroxy-5,5'-ditertbutyldiphenyl sulfide, prepared as described in Example III, is incorporated in the polystyrene. This serves to inhibit deterioration of the polystyrene upon exposure to weathering.

EXAMPLE VIII

The borate of 2,2'-dihydroxy-3,5,3',5'-tetraisopropyldihydroxydiphenyl sulfide, prepared as described in Example IV, is utilized as an inhibitor in polyvinyl chloride plastic. The additive is incorporated by partly melting the polyvinyl chloride plastic and adding the inhibitor into the hot melt in a concentration of 0.75 percent by weight. This serves to inhibit deterioration of the polyvinyl chloride plastic upon exposure to oxygen.

I claim as my invention:

1. Plastic selected from the group consisting of polymonoolefins, polystyrene and polyvinyl chloride normally subject to deterioration due to oxidation and/or ultraviolet light containing, as inhibitor against such deterioration, a minor but stabilizing concentration of a borate of a dihydroxydiphenyl sulfide of the following general formula

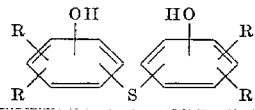

where R is hydrogen, halogen, alkyl of from 1 to 20 carbon atoms, cycloalkyl containing from 3 to 10 carbon atoms in the cyclic structure, phenyl, naphthyl, or anthracyl.

2. The plastic of claim 1 being polystyrene.
3. The plastic of claim 1 being polyethylene.
4. The plastic of claim 1 being polypropylene.
5. The plastic of claim 1 in which said dihydroxydiphenyl sulfide is a 2,2'-dihydroxydiphenyl sulfide.
6. The plastic of claim 5 in which said dihydroxydiphenyl sulfide is 2,2'-dihydroxy-5,5'-dialkyldiphenyl sulfide.
7. The plastic of claim 1 in which said dihydroxydiphenyl sulfide is a 4,4'-dihydroxydiphenyl sulfide.
8. The plastic of claim 7 in which said dihydroxydiphenyl sulfide is 3,3'-dialkyl-4,4'-dihydroxydiphenyl sulfide.
9. The plastic of claim 1 in which said borate is alkyl boronate of 2,2'-dihydroxy-5,5'-dialkyldiphenyl sulfide.
10. The plastic of claim 9 in which said borate is nonylboronate of 2,2'-dihydroxy-5,5'-di-tert-octyl-diphenyl sulfide.
11. A polymer composition comprising a polymer of an alpha-mono-olefin having 2 to 4 carbon atoms having incorporated therein a stabilizing amount of a borate of a 4,4' thio-bis-phenol.

* * * * *